No. 616,437. Patented Dec. 20, 1898.
H. F. A. KLEINSCHMIDT.
ELECTRIC WELDING.
(Application filed Feb. 7, 1898.)

(No Model.)

UNITED STATES PATENT OFFICE.

HENRY F. A. KLEINSCHMIDT, OF JOHNSTOWN, PENNSYLVANIA, ASSIGNOR, BY MESNE ASSIGNMENTS, TO THE LORAIN STEEL COMPANY, OF OHIO.

ELECTRIC WELDING.

SPECIFICATION forming part of Letters Patent No. 616,437, dated December 20, 1898.

Application filed February 7, 1898. Serial No. 669,353. (No model.)

*To all whom it may concern:*

Be it known that I, HENRY F. A. KLEINSCHMIDT, of Johnstown, in the county of Cambria and State of Pennsylvania, have invented new and useful Improvements in Electric Welding, of which the following is a full, clear, and exact description, reference being had to the accompanying drawings, which form a part of this specification.

This invention (Case B) relates to electrically-welded rail-joints, and has for its object the provision of a novel form of splice-bar to be welded to the rail and also a novel method of welding the same by means of which the tenacity of the joint is largely increased.

I am aware of an application filed on an even date herewith, Serial No. 669,379, by Richard Eyre and William Dishong for "electrically-welded joint." My invention involves improvements in the invention set forth in said application, in which is described a joint having end projections to be welded to the rail, said projections being of a shape suited to withstand longitudinal tension, and a central member connected to the ends of both rails, said member being of a shape adapted to give great transverse stiffness to the joint.

The present invention relates specifically to an improvement in the conformation of the end projections and to the method of welding the splice-bars to the rail, which enables me to provide a joint in which the ends of the rails are secured in a state of compression, while the splice-bars are in a state of tension. In the following description of my invention the advantages of the same will be made to appear more fully.

Figure 2:
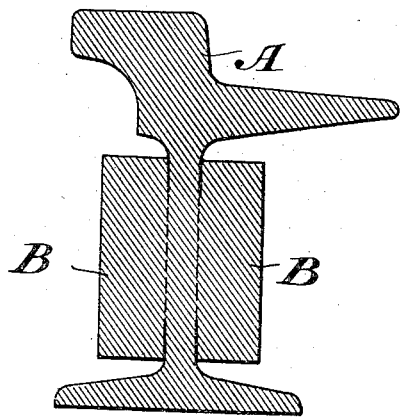
Figure 1:
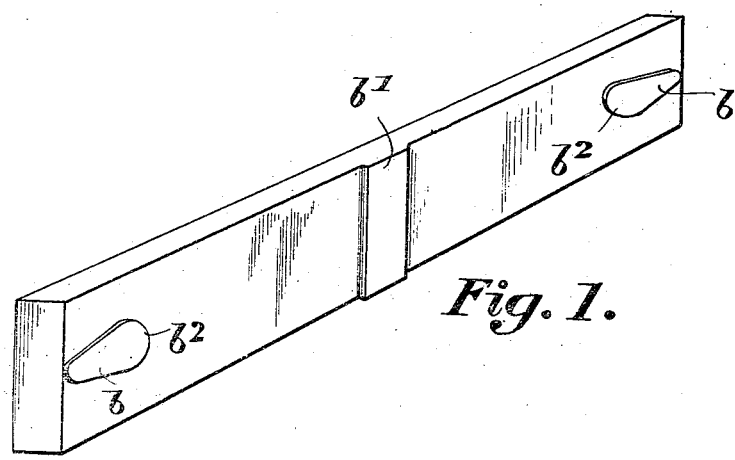

Referring to the drawings, Figure 1 is a splice-bar of my invention, which is also well adapted for use with my improved method. Fig. 2 is a sectional view of a part of a joint corresponding in position to a line drawn through one of the projections $b$.

A represents the rail, and B the splice-bars.

$b\ b$ represent projections at the ends of the splice-bars which are to be welded to the rails.

$b'$ is a central member to be welded to both rails. The central member $b'$ is vertically disposed and the end members $b$ are horizontally disposed.

The end projections are horizontally disposed, so that while having sufficient area to withstand shearing caused by tension in the rails they will not convey heat during the welding process to a sufficient portion of the sectional area of the rail to seriously weaken the same. The central members are vertically disposed, so as to afford transverse stiffness to the joint.

The special improvement in the splice-bar which is involved in the present invention is in the provision of an ovoid or exaggerated ovoid shape for the end bosses $b$, said ovoids being disposed, as shown, with their longer axes lying in a horizontal plane and with the smaller pointed ends of the ovoids at the extreme outer ends of the bar. This ovoid form has two advantages. It gives the required amount of area without necessitating either the undue heating of the rail at the end of the splice-bar, as would be the case in a vertically-disposed projection, and yet does not require too great a longitudinal contact between the projection and the rail, as is required of a uniformly-shaped and horizontally-disposed projection. It obviously does no harm if the rails at the inner ends $b^2$ of the projections are weakened by the heat conveyed to them, for at this point they are not obliged to withstand any serious tension. The second advantage which this shape has is that, if desired, the large end $b^2$ of the ovoid may engage the rail at a point where it is perforated by a splice-bar hole.

The novel method which I have before mentioned consists in welding the bars to the rail in such a manner that a joint is provided having those portions of the abutting rails between the projections $b$ in a state of compression, while the splice-bars themselves are in a state of tension. To achieve this, I first weld the central member $b'$ to both rails. This forms a path from one splice-bar to the other through both rails. Afterward I weld the end projections to the rails. In making these later welds part of the heating-current passes longitudinally through the splice-bars and through the central member, heating the bars in its passage, so that the bars expand and are fixed in position to the rails in their expanded condition. When they become cold, therefore, they are in a condition of tension, and this stress obviously is transmitted to the rails, which are therefore in a state of compression. The advantage of this result is clear. The first tension put into the railway-track by its tendency to contract in cold weather will be withstood entirely by the splice-bars, and there can be no strain on the center weld until the original compression of the rails has been entirely relieved.

It is of course clear that the scope of my invention is broader than the precise details which I have shown and described, and I do not therefore limit myself to them. For example, either the end projections $b$ or the central member $b'$ may be separate pieces, which are welded to the splice-bars simultaneously with the operation of welding them to the rail.

Having thus described my invention, what I claim, and desire to protect by Letters Patent, is—

1. The herein-described method of joining rails and parallel splice-bars, which consists in welding the central portion of the splice-bars to the sides of both rails, and then welding opposite end portions of the splice-bars to the sides of each rail, substantially for the purpose set forth.

2. The method of joining rails and splice-bars for continuous track, which consists in first welding a central member of each bar to the sides of both rails and then welding opposite end portions of the bars to each rail, substantially for the purpose set forth.

3. The method of welding splice-bars to rails for continuous track which consists in first welding a central portion of the splice-bar to the sides of both rails and maintaining the bar at a comparatively high temperature by passing current longitudinally therethrough while welding the end portions to the rails.

4. The method of welding splice-bars to rails for continuous track, which consists in first welding a central portion of the splice-bars to both rails, then passing current longitudinally through the splice-bars while welding end portions thereof to the rails, thereby causing a tension strain in the bars when cooled.

5. The improvement in the art of constructing continuous track consisting in fastening splice-bars to the ends of the rails in a condition of longitudinal tension, the rails between the ends of each splice-bar being in a condition of longitudinal compression.

6. The rails and a pair of splice-bars welded thereto in a condition of longitudinal tension.

7. A rail-joint comprising the rails and a pair of splice-bars welded thereto, the rails between the ends of said bars being in a state of longitudinal compression while the splice-bars are in a state of longitudinal tension.

8. A splice-bar for a welded joint having ovoid end projections with their longer axes horizontally disposed and the smaller end of each ovoid at the outer edge of the splice-bar.

9. The combination of a pair of rails, a pair of splice-bars, a weld between the central portion of the same and both rails, and horizontally-disposed ovoid end projections on said splice-bars welded to both rails.

In testimony whereof I have affixed my signature in presence of two witnesses.

HENRY F. A. KLEINSCHMIDT.

Witnesses:
RICHARD EYRE,
MYRTLE E. SHARPE.